(12) United States Patent
Griffith

(10) Patent No.: US 6,920,771 B1
(45) Date of Patent: Jul. 26, 2005

(54) LOCK-DOWN DEVICE FOR AN ALL-TERRAIN VEHICLE

(76) Inventor: James Robert Griffith, P.O. Box 184, Verner, WV (US) 25650

( * ) Notice: Subject to any disclaimer, the term of this patent is extended or adjusted under 35 U.S.C. 154(b) by 107 days.

(21) Appl. No.: 10/817,614

(22) Filed: Apr. 2, 2004

(51) Int. Cl.[7] .............................................. B60R 25/00
(52) U.S. Cl. ................................ 70/225; 70/18; 70/226; 70/237; 188/32
(58) Field of Search ........................... 70/14, 18, 19, 70/225, 226, 237, 259, 260; 188/32; 280/402; 180/287; 410/9, 10, 12, 19, 20, 30

(56) References Cited

U.S. PATENT DOCUMENTS

| | | | |
|---|---|---|---|
| 770,510 A | * 9/1904 | Stullken | 188/32 |
| 1,488,893 A | 1/1924 | Plouffe | |
| 2,418,279 A | * 4/1947 | Sax et al. | 188/32 |
| 2,475,111 A | * 7/1949 | Ridland | 188/32 |
| 2,771,162 A | * 11/1956 | Marsh | 188/32 |
| 3,581,846 A | 6/1971 | Janus | |
| 3,687,238 A | * 8/1972 | Carpenter | 188/32 |
| 3,695,071 A | 10/1972 | West | |
| 3,826,114 A | 7/1974 | Emerson | |
| 4,312,452 A | * 1/1982 | Waier | 211/23 |
| 4,418,551 A | * 12/1983 | Kochackis | 70/18 |
| 4,651,849 A | 3/1987 | Givati | |
| 4,653,967 A | * 3/1987 | Isaksson et al. | 410/49 |
| 4,696,449 A | * 9/1987 | Woo et al. | 248/553 |
| 4,711,325 A | * 12/1987 | Mountz | 188/32 |
| 4,819,462 A | 4/1989 | Apsell | |
| 4,854,144 A | 8/1989 | Davis | |
| 4,871,291 A | 10/1989 | Moore et al. | |
| 4,968,052 A | * 11/1990 | Alm et al. | 280/402 |
| 5,076,079 A | * 12/1991 | Monoson et al. | 70/58 |
| 5,106,245 A | 4/1992 | Fritz et al. | |
| 5,123,802 A | * 6/1992 | Bell | 414/563 |
| 5,214,944 A | 6/1993 | Wolthoff | |
| 5,375,442 A | 12/1994 | Hammer | |
| 5,427,210 A | * 6/1995 | Willaford | 188/32 |
| 5,582,044 A | * 12/1996 | Bolich | 70/58 |
| 5,593,260 A | 1/1997 | Zimmerman | |
| 5,613,385 A | * 3/1997 | Yamabe | 70/226 |
| 5,655,631 A | * 8/1997 | Richardson | 188/32 |
| 5,724,839 A | 3/1998 | Thering | |
| 5,868,016 A | * 2/1999 | Duran, Sr. | 70/209 |
| 5,887,462 A | * 3/1999 | Stone | 70/19 |
| 5,887,464 A | * 3/1999 | Perez | 70/209 |
| 6,000,255 A | 12/1999 | Lester | |
| 6,099,219 A | * 8/2000 | Bartholomay | 410/20 |
| 6,116,062 A | * 9/2000 | Markegard et al. | 70/19 |
| 6,125,672 A | * 10/2000 | Diez | 70/226 |
| 6,298,695 B1 | * 10/2001 | Vezina et al. | 70/58 |
| 6,581,954 B2 | * 6/2003 | Chadwick | 280/491.1 |
| 6,662,607 B2 | 12/2003 | O'Neal | |
| 6,725,979 B1 | * 4/2004 | Snook | 188/32 |

* cited by examiner

Primary Examiner—Suzanne Dino Barrett
(74) Attorney, Agent, or Firm—Bowles Rice McDavid Graff & Love; John J. Giblin, Jr.; Anthony P. Tokarz

(57) ABSTRACT

A lock-down device for use on an all-terrain vehicle, comprised of a rectangular base which mounts to a surface such as a garage floor or bed of a pick-up truck, four sockets mounted at each corner of the base, a flat rear panel with two bolts pivotally articulating on its bottom edge, a wheel cover, a flat rear panel which pivotally articulates with the wheel cover and which has two bolts on the bottom edge of the rear panel. The bolts on the rear panel and the front panel register with the four sockets on the base. The rear panel engages with the wheel cover by a latching mechanism.

5 Claims, 4 Drawing Sheets

LOCK-DOWN DEVICE FOR AN ALL-TERRAIN VEHICLE

BACKGROUND OF THE INVENTION

1. Field of the Invention

The present invention relates to a lock-down device for all-terrain vehicles, more specifically to a device for securing the rear tires of an all-terrain vehicle against movement.

2. Description of the Prior Art

All-terrain vehicles ("ATVs") are a popular accessory for many homeowners and outdoor sportsman. The ATVs are often stored in garages and transported on trailers or on the beds of pick-up trucks. These raise two concerns. For one is owners of the ATVs are concerned about security, theft or unauthorized movement of the ATV by others. They are also concerned about movement of the ATV when in a truck bed or trailer while transporting the ATV. To alleviate these concerns, ATV owners seek means to secure an ATV to a floor or to a vehicular bed to prevent any undesired movement, either by unauthorized persons or during transport.

Various devices are currently available that serve one or both of these desires. For example, U.S. Pat. No. 3,581,846, issued to Januo on Jun. 11, 1971 for a Safety Locking Block Device for Wheeled Vehicles, discloses a pair of blocks which clamp to the front and rear surfaces of a tire. However, this apparatus provides no means for securing to a floor or vehicle bed.

U.S. Pat. No. 5,375,442, issued to Hammer on Dec. 27, 1994 for a Clamp Assembly for a Trailer for Like Wheeled Vehicle, provided for an apparatus that clamped onto the wheel of a trailer or vehicle. However, this apparatus would still permit approximately ¾ rotation of the wheel, which may be unacceptable in transport situations. The apparatus is also unusable on solid wheel rims which are commonly used on ATVs and small tractors.

U.S. Pat. No. 5,593,260, issued to Zimmerman on Jan. 14, 1997 for an Apparatus for Securing a Vehicle to a Trailer, provides an apparatus with two bars that clam around a tire of an ATV and are held in place by a chain. However this mechanism can easily be defeated simply by temporarily deflating the tire and removing the chain.

U.S. Pat. No. 5,724,839, issued to Thering on Mar. 10, 1998, for a vehicle Locking Means with Wheel Clamps, provides an apparatus similar to a bar clamp which clamps to the outer sides of the wheels of an ATV. This device would permit approximately a ½ rotation of the wheels and cannot be secured to the floor or truck bed.

Finally, U.S. Pat. No. 6,000,255, issued to Lester on Dec. 14, 1999 for an Anti-Theft Device for All-terrain Vehicles. However the entire device must remain in place and creates an obstruction of use of the space occupied by the apparatus.

SUMMARY OF THE INVENTION

To provide a means for securing and preventing theft of an ATV or other small vehicle, the present invention is comprised firstly of a base which is secured to a floor or bed of a pick-up truck or trailer. The base is rectangular in shape with four sockets at each corner, orientated parallel to the long axis of the base. The present invention is also comprised of a wheel cover which encloses approximately the upper half of the ATV tire and wheel. A front panel is provided, the top edge of which is pivotally engaged with the front edge of the wheel cover. On the bottom edge of the front panel, two bolts are pivotally engaged. These two bolts register with the two front sockets of the base. A rear panel is provided, which similarly has two bolts pivotally engaged on its lower edge, which similarly engage with the rear sockets on the base. When all four bolts of the front and rear panels are engaged with the corresponding sockets, a latch mechanism, one part of which is disposed on the top edge of the rear panel and the other part is disposed on the rear edge of the wheel cover, are engaged, provide an integral cover around the ATV wheel which anchors the ATV in place and prevents any undesired or unauthorized movement of the ATV.

One objective of the invention is to provide an apparatus for securing the wheel of an ATV to a stationary surface.

Another objective is to provide an apparatus capable of securing a wheel of an ATV to a stationary surface but which can be at least partially dismantled and stored when not in use to prevent interference with other uses of the surface.

Another objective is to provide an apparatus capable of securing an ATV wheel to a surface with minimal horizontal free play and travel when secured.

These and other objectives and advantages of the invention will become apparent to those skilled in the art from the description which follows. In the description, reference is made to the accompanying drawings, which form a part hereof, and in which are shown by way of illustration of specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DETAILED DESCRIPTION OF THE INVENTION

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Figure 1:
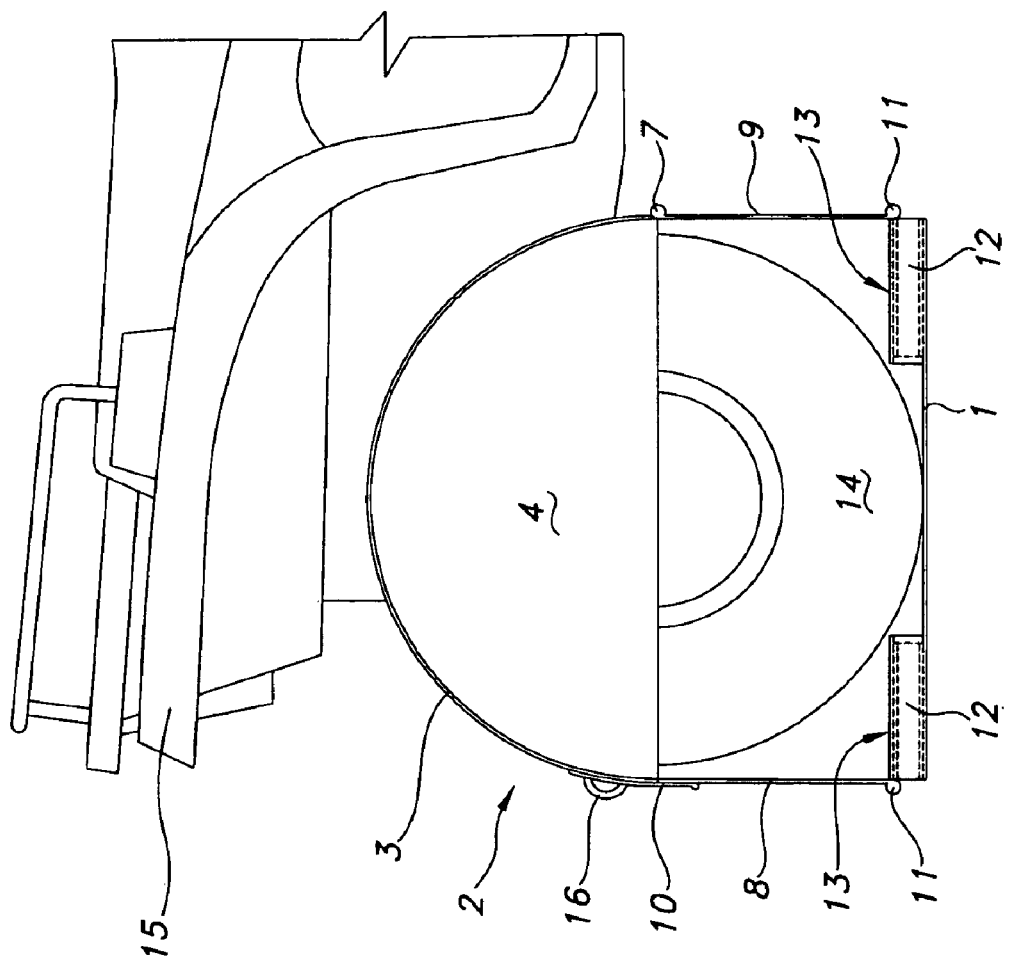
FIG. 1 is an elevational view displaying the invention mounted on an ATV.
Figure 2:
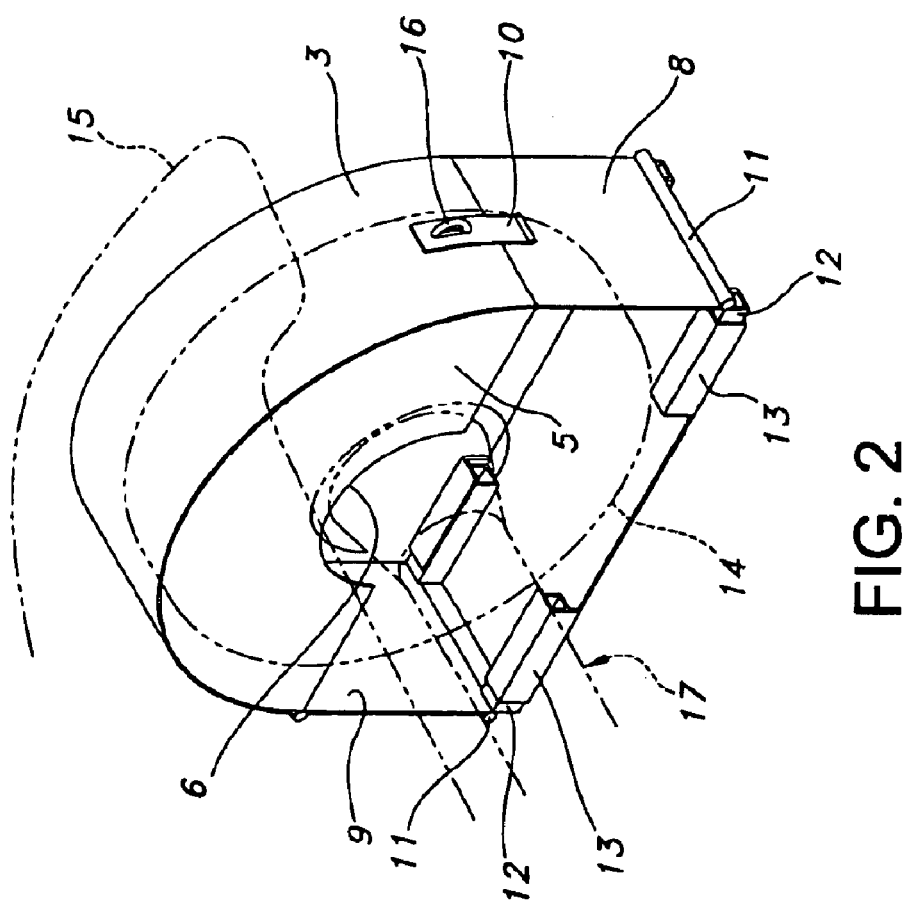
FIG. 2 is an isometric view of the invention.

As shown in FIGS. 1 and 2, a lock-down device for an ATV is comprised of, firstly, a wheel cover 2. The wheel cover 2, is generally a horizontal semi-cylindrical container, having an arcuate top surface 3 with inner and outer side edges. The wheel cover 2 is also comprised of an interior side panel 5 and exterior side panel 4, each of which have an arcuate upper edge which is joined orthogonally to the respective side edges of the top surface 3. As assembled, the wheel cover 2 can be positioned over a rear wheel 14 of an ATV to hold the ATV stationery. The interior side panel 5 has a cut-out section 6 centrally disposed on its bottom edge which, when the wheel cover 2 is disposed on an ATV wheel 14, provides clearance for the wheel axle 17.

Figure 4:
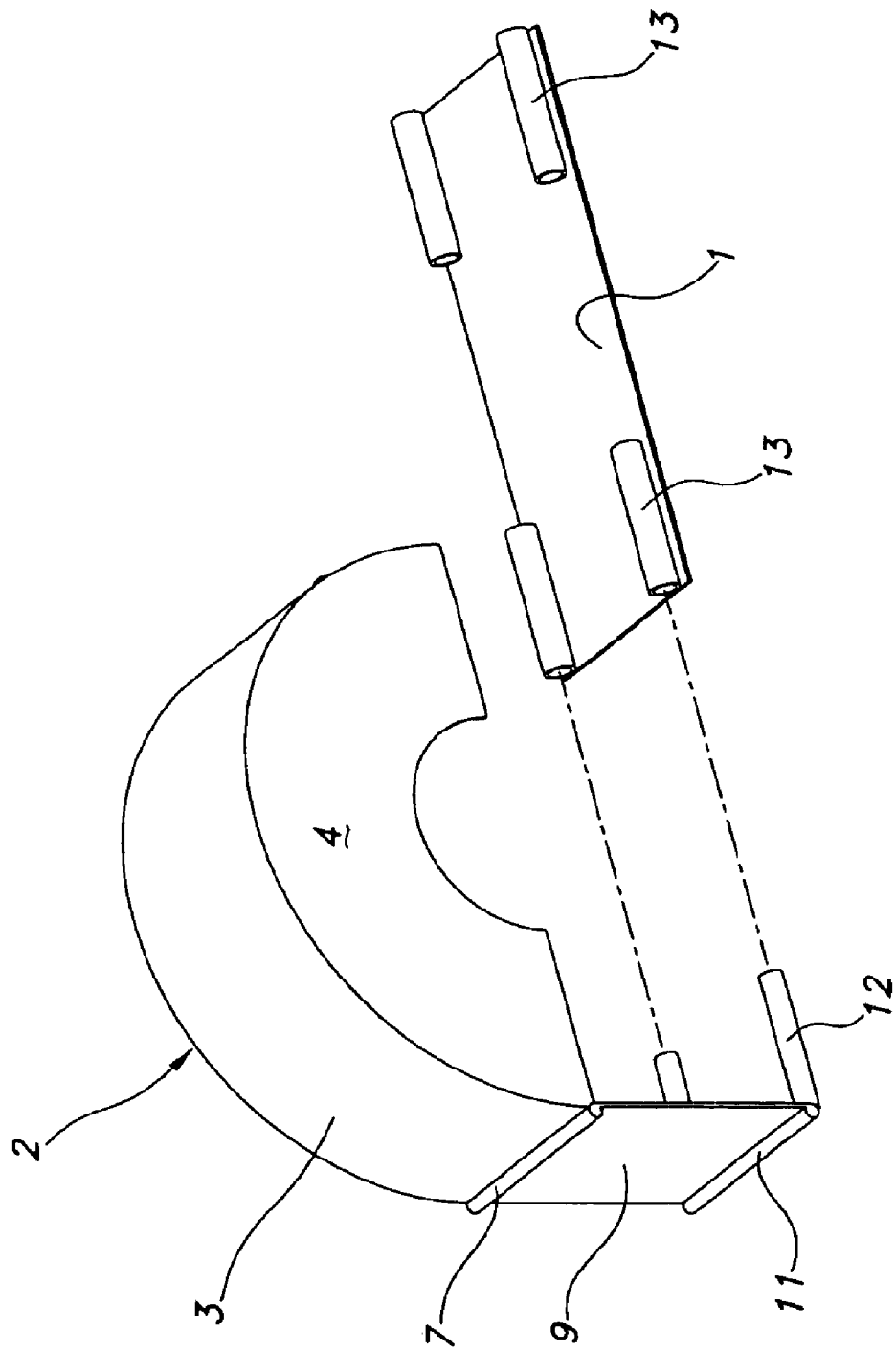
FIG. 4 is an isometric view of the details of the base, wheel cover and front plate, showing an alternative embodiment for the bolts and sockets.

As best shown in FIG. 4, the lockdown device is next comprised of a front panel 9, a generally rectangular flat plate, having a top edge which is pivotally engaged with the top surface 3 by a front panel hinge 7 disposed at the front edge of the top surface 3. The width of the front panel 9 is substantially equal to the width of the top surface 3 of the wheel cover 2.

Two bolts 12 are pivotally engaged to the bottom edge of the front plate 4 by a bolt hinge 11. The two bolts 12 are extended linear rods with one of various cross-sectional shapes, preferably square or circular, which are affixed to the bolt hinge 11 at or near the lower corners of the front plate, directed rearward under the wheel cover 2.

Figure 3:
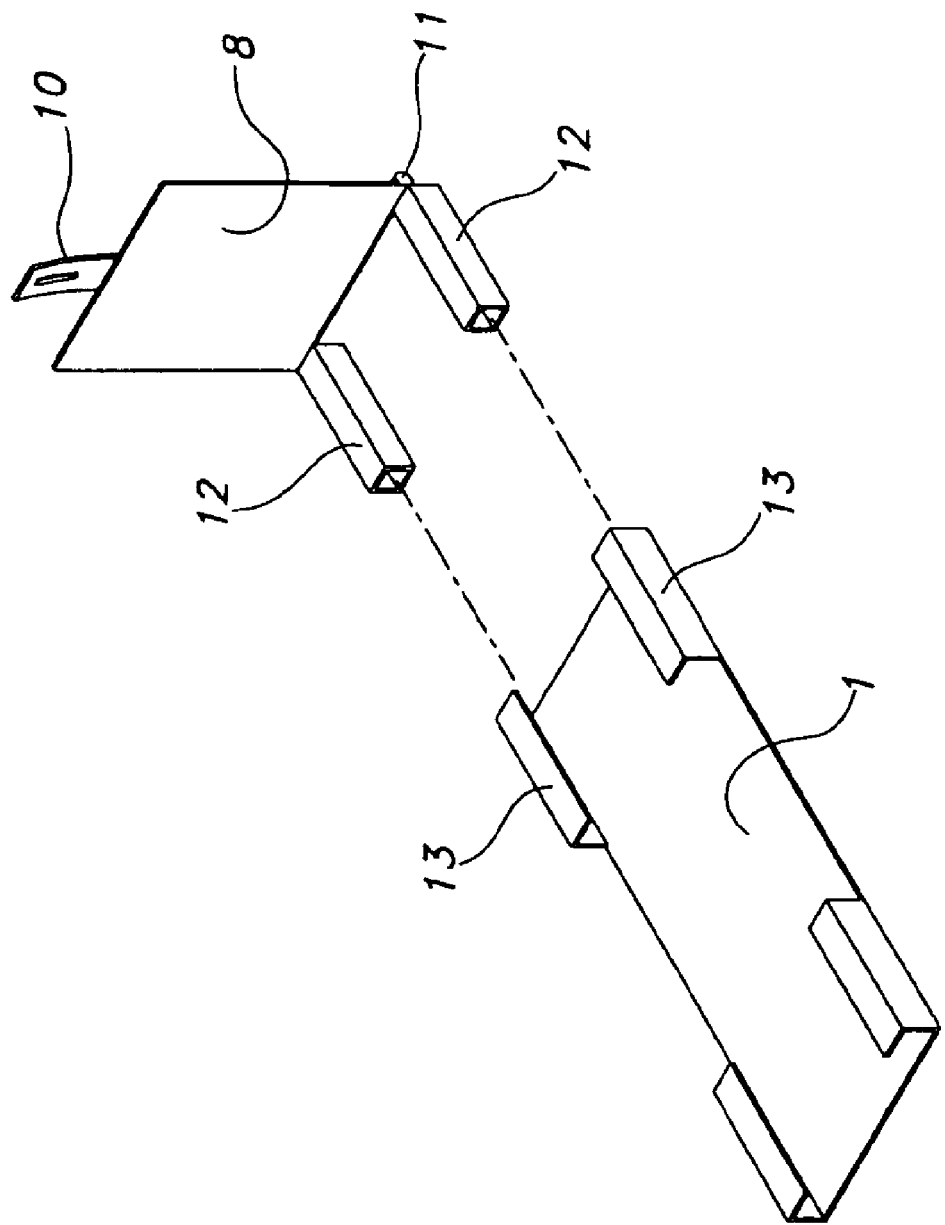
FIG. 3 is an isometric view of the details of the base and rear plate, showing the preferred embodiment for the bolts and sockets.

Further comprising the present invention is a base 1. The base 1 is a flat horizontal plate of a rectangular shape with dimension which is substantially the same as the projected area under the wheel cover 2. As best shown in FIG. 4, at each of the four corners of the base 1 is a socket 13. Each socket 13 is aligned parallel to the major longitudinal axis of the base 1. Two sockets 13 are disposed at the front edge, and are spaced laterally so as to permit registration of the two bolts 12 on the lower edge of the front panel 9. In the preferred embodiment, as shown in FIG. 3, the sockets 13 are comprised of an inverted "L" bracket disposed along the lateral edges at either end of the base 1. This inverted "L" bracket defines the upper and outer surfaces of each socket 13. The corresponding bolts 12 used with this type socket 13 would be tubular members with square or rectangular cross sections. The dimensions of the bolts 12 and their disposition provide a snug registration within the two sockets 13. In an alternate embodiment, as shown in FIG. 4, the sockets 13 are cylindrical, with an annular interior. The bolts 12 are likewise cylindrical, again with dimensions and dispositions to facilitate registration with the interior of the sockets 13.

As shown in FIG. 3, two sockets 13 are disposes at the rear edge of the base 1, likewise aligned parallel to the major longitudinal axis of the base 1, and spaced laterally equal to the spacing of two bolts 12 on a rear panel 8, described below.

The rear panel 8 is a rectangular plate. A first latch member 10 is disposed near the center of the top edge of the rear panel 8. A corresponding second latch member 16 is disposed on the wheel cover 2 top surface 3 proximate to its rear edge and disposed such that the two latch members register when the top edge of the rear panel 8 is aligned with the rear edge of the wheel cover 2 top surface 3.

The rear panel 8 likewise has two bolts 12 that have one end which each are pivotally engaged with the lower edge of the rear panel 8 by a bolt hinge 11. They are disposed at either lower corner of the rear panel 8, aligned forward and spaced so as to register with the two sockets 13 at the rear edge of the base 1. When the two bolts 12 of the rear panel 8 are registered with the sockets 13, and the two latch members are engaged, the rear panel 8 becomes firmly associated with the wheel cover 2.

The invention in normal use is used in pairs. Each device of the pair is an inverse of the other, for use on either the right or left rear wheel of an ATV. For the device for the right rear wheel, the wheel cover 2 panel with the cut out section 6 is disposed on the left side, while, on the device for the left rear wheel, the wheel cover 2 inner panel is disposed on the right side. In FIG. 1, the version for the right wheel is shown, while the version for the left wheel is shown in FIG. 2.

As shown in FIG. 1, the lockdown device is installed by first securing one or two bases 1 to a floor truck bed or other ground surface. If two bases 1 are used, they are aligned parallel and laterally spaced equal to the distance between the rear wheels of the ATV being secured. The ATV is then positioned with its rear wheels 14 disposed centrally over each of the base 1.

The correct wheel cover 2 for each side of the ATV is selected, noting that the panel permanently articulated with the wheel cover 2 is the front panel 9, which must face forward on the ATV, while the panel on the wheel cover 2 with the cut-out section 6 is the interior panel and must be disposed towards the vehicle so as to provide clearance for the wheel axle 17. The wheel cover 2 is then positioned over the ATV wheel 14. The front panel 9 may have to be manipulated to clear the fender 15 over the ATV wheel 14. The pivotal articulation of the front panel 9 by the front panel hinge 7 permits maneuvering it between areas of limited clearance between the fender 15 and the tire 14. Once the wheel cover 2 is positioned, the front edge of the top surface 3 is lowered towards the base 1. This causes the front panel 9 to protrude forward and to assume a more horizontal attitude. As the front plate 9 is lowered, its bottom edge slides forward, away from the base 1, bringing the ends of the bolts 12 off the base 1, and forward of the plane of the forward openings of the sockets 13. The ends of the two bolts 12 are then registered with the corresponding sockets 13. The wheel cover 2 is rotated rearward, lifting the top edge of the front plate and causing the bolts 12 to slide into the sockets 13. When the forward plate has reached a vertical attitude, the bolts 12 will reach full engagement with the sockets 13.

The rear panel 8 is then installed onto the lockdown device by positioning the rear panel 8 vertically behind the wheel with the ends of the bolts 12 aligned with the rear sockets 13. The bolts 12 are registered with the sockets 13, and the rear panel 8 is translated forward until the bolts 12 are fully engaged with the rear socket 13. The first and second latch members 10, 16 are then engaged. A lock may be applied to the latch to prevent unauthorized disassembly of the lockdown device.

The various parts of the lockdown device are preferable fabricated from metal, more preferably from carbon steel.

While various embodiments of the invention have been described above, it should be understood that they have been presented by way of example, and not limitation. It will be apparent to person skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. An ATV lock-down device, comprised of:
    (a) a base, comprised of a flat rectangular plate with a forward and rear edges and horizontal sockets disposed at each corner of the base, said sockets disposed parallel to the longer sides of the base and defining an opening,
    (b) a rear panel, comprised of a flat rectangular plate having a top edge and a bottom edge, (c) a pair of bolts, one end of each of which is pivotally articulated with the bottom edge of the rear panel, and of a dimension and spacing for registration with the opening of the sockets on the rear edge of the base, (d) a wheel cover, comprised of an interior and exterior vertical side panel, each side panel having a semicircular upper edge, and an arcuate rectangular top panel with interior and exterior edges and front and rear edges, said top panel disposed horizontally and curved around an axis orthogonal to its major axis, said semicircular upper edges of said interior and exterior rigidly disposed with the interior and exterior edges of the top panel, (e) a front panel, comprised of a flat rectangular plate with a top edge and a bottom edge, said top edge pivotally engaged with the front edge of the top panel of the wheel cover, (f) a pair of bolts, one end of each of which is pivotally engaged with either end of the bottom edge of the front panel and the other end of each of which registers with each of the sockets disposed on the front edge of the base.

2. The lock-down device of claim 1, wherein the bolts have a square cross-sectional shape.

3. The lock-down device of claim 1, wherein the bolts have a circular cross-sectional shape.

4. The lock-down device of claim 1, further comprising a first latch member disposed on the rear edge of the top surface of the wheel cover and a second latch member disposed on the top edge of the rear panel, wherein said second latch member engages with said first latch member to articulate the rear panel with the wheel cover.

5. The lock-down device of claim 1, further comprising a cut-out section removed from the interior side panel of the wheel cover.

* * * * *